UNITED STATES PATENT OFFICE.

JOHANN MEESE, OF LEER, PRUSSIA, GERMANY.

COMPOSITION FOR TREATING THE SURFACES OF METALS.

SPECIFICATION forming part of Letters Patent No. 445,320, dated January 27, 1891.

Application filed March 4, 1890. Renewed December 30, 1890. Serial No. 376,214. (No specimens.) Patented in Belgium September 23, 1889, No. 87,823, and in England November 9, 1889, No. 17,878.

*To all whom it may concern:*

Be it known that I, JOHANN MEESE, of the city of Leer, Prussia, Germany, have invented a certain new and useful Composition for Treating Surfaces of Metals, (for which I have obtained patents in Belgium, No. 87,823, dated September 23, 1889, and in England Provisional Patent No. 17,878, dated November 9, 1889,) of which the following is a specification.

This invention relates to a composition for treating iron and other metals preparatory to coating them with a vitrifiable or other body, plain or colored, for ornamenting and general embellishment.

After repeated experiments I have been led to manufacture a durable and fire-proof material for coating iron and other metals, my process having, as compared with those hitherto known, the advantage of great simplicity combined with cheapness. The color of the coating has a light shade and a dull appearance, these properties being of the greatest value for the further treatment of the metals by means of fusible colors, as it is only upon a light ground that the fusible colors fully exhibit on iron their original beauty or brilliancy. A light-colored and dull ground has only hitherto been obtained by means of aluminum, and this product has still such a high value in commerce at the present time that it can scarcely be employed on a large scale in practice.

I carry out my invention by first preparing oxide of nickel, and in adding to the finely-triturated powder of this oxide a small percentage of powdered chromate of iron. With this powder I further mix a lead-glass flux, such as can be purchased in the market, and I triturate the whole mass with a mixture of stearic oil and oil of turpentine in a shell, cup, or mortar. I subsequently smear this mixture thinly upon the object requiring to be ornamented or decorated and calcine it in a muffle or in a furnace. Upon the object thus treated fusible colors or metals in the form of powder can be applied and burned in. I may also give the described mixture or otherwise ground shade another character, as I can add directly thereto fusible colors or metals in the form of a powder.

The chief features of novelty are a mixture of nickel-oxide and chromate of iron in the form of a powder, with oil of stearine and oil of turpentine, with the addition of a lead-glass flux, such as can be procured in commerce, for the preparation of a durable fire-proof coating material for iron and other metals which is fired thereon by fusion; the use of the mixture, as above, in combination with fusible colors and metals in a powdered form, for the purpose mentioned.

What I claim as new, and desire to secure by Letters Patent of the United States, is—

1. A composition for the purpose described, comprising nickel-oxide, chromate of iron, and a suitable flux.

2. A composition for the purpose set forth, consisting of nickel-oxide, chromate of iron, a suitable oil or oils, and a lead-glass flux.

3. A composition for the purpose described, consisting of nickel-oxide, chromate of iron, oil of stearine, oil of turpentine, and a lead-glass flux, substantially as described.

In witness whereof I have hereunto signed my name in the presence of two subscribing witnesses.

JOHANN MEESE.

Witnesses:
  F. GAFFKY,
  W. KESSLER.